(12) United States Patent
Peri et al.

(10) Patent No.: US 7,747,992 B2
(45) Date of Patent: Jun. 29, 2010

(54) METHODS AND APPARATUS FOR CREATING SOFTWARE BASIC BLOCK LAYOUTS

(75) Inventors: Ramesh Peri, Austin, TX (US); Zino Benaissa, Austin, TX (US); Srinivas Doddapaneni, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1621 days.

(21) Appl. No.: 10/924,660

(22) Filed: Aug. 23, 2004

(65) Prior Publication Data

US 2006/0041875 A1 Feb. 23, 2006

(51) Int. Cl.
*G06F 9/45* (2006.01)
(52) U.S. Cl. .................. 717/158; 717/151; 717/155; 717/156; 717/159
(58) Field of Classification Search .................. None
See application file for complete search history.

(56) References Cited

U.S. PATENT DOCUMENTS

| | | | | |
|---|---|---|---|---|
| 5,950,009 | A * | 9/1999 | Bortnikov et al. | 717/158 |
| 6,292,934 | B1 * | 9/2001 | Davidson et al. | 717/158 |
| 6,463,582 | B1 * | 10/2002 | Lethin et al. | 717/158 |
| 6,957,422 | B2 * | 10/2005 | Hunt | 717/130 |
| 2004/0015930 | A1 * | 1/2004 | Wu | 717/158 |

OTHER PUBLICATIONS

Calder et al., "Reducing Branch Costs via Branch Alignment", 1994, ACM, pp. 242-251.*
Ramirez et al., "Instruction Fetch Architectures and Code Layout Optimizations", Nov. 2001, IEEE, pp. 1588-1609.*
Kathail et al., "Compiling for EPIC Architectures", Nov. 2001, IEEE, pp. 1676-1693.*
Young et al., "Near-optimal Intraprocedural Branch Alignment", 1997, ACM, pp. 183-193.*
Haghighat et al., "The Future of Code-Coverage Tools", Jun. 17, 2004, StickyMinds.com, pp. 1-5 <http://www.stickyminds.com/sitewide.asp?Function=edetail&ObjectType=ART&ObjectId=7580>.*
Cilio et al., "Code Positioning for VLIW Architectures", Jan. 1, 2001, Springer-Verlag Berlin Heidelberg, pp. 332-343.*
Young et al., Massachusetts Institute of Technology, *Near-optimal Intraprocedural Branch Alignment*, 1997, pp. 183-193.
Calder et al., University of Colorado, *Reducing Branch Costs via Branch Alignment*, Oct. 1994, pp. 242-251.
Pettis et al., Hewlett-Packard Company, *Profile Guided Code Positioning*, Jun. 22, 1990, pp. 16-27.

* cited by examiner

*Primary Examiner*—Michael J Yigdall
*Assistant Examiner*—Ben C Wang
(74) *Attorney, Agent, or Firm*—Hanley, Flight & Zimmerman, LLC

(57) ABSTRACT

Methods and apparatus to create software basic block layouts are disclosed. In one example, a method identifies branch data associated with a plurality of machine accessible instructions and identifies a plurality of basic blocks associated with the branch data. The method generates a partial layout from the plurality of basic blocks and generates a substantial layout from the partial layout based on a cost metric.

28 Claims, 14 Drawing Sheets

800 ⟶

802: $\Sigma$ cost($v_i$, $v_{i+1}$)
804: i=1,n-1

```
810: cost(p1, p2)
812: {
814:     if (p1, p2)∈E ∧ ∃X. ((p1, X)∈E ∧ X≠p2)
816:         result = min    (
818:                         IU*F(p1, p2)+CT*F(p1, X),
820:                         CU*F(p1, p2)+IT*F(p1, X)
822:                         );
824:     else if ((p1, p2)∉E ∧ ∃X,Z.((p1, X)∈E ∧ (p2, Z)∈E ∧ X≠Z))
826:         result = min    (
828:                         (IU+U)*F(p1, Z)+CT*F(p1,X),
830:                         (CU+U)*F(p1, Z)+IT*F(p1,X),
832:                         (IU+U)*F(p1, X)+CT*F(p1,Z),
834:                         (CU+U)*F(p1, X)+IT*F(p1,Z)
836:                         );
838:     else if ((p1, X)∈E ∧ (p1, p2)∉E ∧ out-degree(p1)=1 )
840:         result = U*F(p1, X);
842:     else if ((p1, p2)∈E ∧ out-degree(p1)=1 )
844:         result = 0;
846:     return result;
848: }
```

FIG. 8B

METHODS AND APPARATUS FOR CREATING SOFTWARE BASIC BLOCK LAYOUTS

TECHNICAL FIELD

The present disclosure is directed generally to processor systems and, more particularly, to methods and apparatus to create software basic block layouts in processor systems.

BACKGROUND

Consumers continue to demand faster computers. To accelerate software execution speeds, many recent efforts have been directed to increasing instruction throughput in modern processor systems (e.g., using a technique called pipelining). Unlike processor systems that require complete execution of an instruction before fetching a subsequent instruction, processor systems that employ pipelining techniques (i.e., pipelined processor systems) do not wait until the result from a previous operation is written back into a register or main memory before executing a subsequent instruction. While pipeline size (i.e., the number of unfinished instructions that can concurrently occupy the pipeline) may fluctuate depending on the processor architecture, modern processor architectures tend to have longer pipelines than earlier processor architectures.

Although pipeline processors typically execute code in an efficient manner, a problem may occur when a branch instruction is processed or executed. A branch instruction may occur within, for example, an if-then-else construct. When the processor initially executes the instruction(s) associated with the if-then-else construct, the location to which the processor must branch is not yet known. As a result, the processor must wait for instructions in the pipeline to complete execution (e.g., the processor stalls) before the branch operation can be executed. With the increased number of instructions held in a modern processor pipeline, waiting for completion of instructions in the pipeline may result in an unacceptable delay.

BRIEF DESCRIPTION OF THE DRAWINGS

FIG. 8A is a pseudo code representation of an example software code block for invoking an example cost metric calculation.

FIG. 8B is a pseudo code representation of an example software code block for calculating a cost metric.

DETAILED DESCRIPTION

The following describes example methods, apparatus, and articles of manufacture that provide a code execution system that may be used to create software basic block layouts. While the following disclosure describes systems implemented using software or firmware executed by hardware, those having ordinary skill in the art will readily recognize that the disclosed systems could be implemented exclusively in hardware through the use of one or more custom circuits, such as, for example, application-specific integrated circuits (ASICs) or any other suitable combination of hardware and/or software.

In general, a software basic block is a sequence of machine accessible instructions that are executed as a set or group. In particular, a software basic block is configured so that only the first instruction of the basic block can be a target of a branch instruction within a program including the basic block. In addition, the software basic block is configured so that only the last instruction of the basic block can be a branch instruction to another part of the program. Persons of ordinary skill in the art will recognize that a basic block layout is a contiguous set of software basic blocks with appropriate instructions (e.g., jump instructions) inserted between the basic blocks to enable a desired flow of execution. The resequencing of the basic blocks and modification of jump statements via the example apparatus and methods disclosed herein can be used to enable a processor system to execute a set of basic blocks more efficiently.

Figure 1:
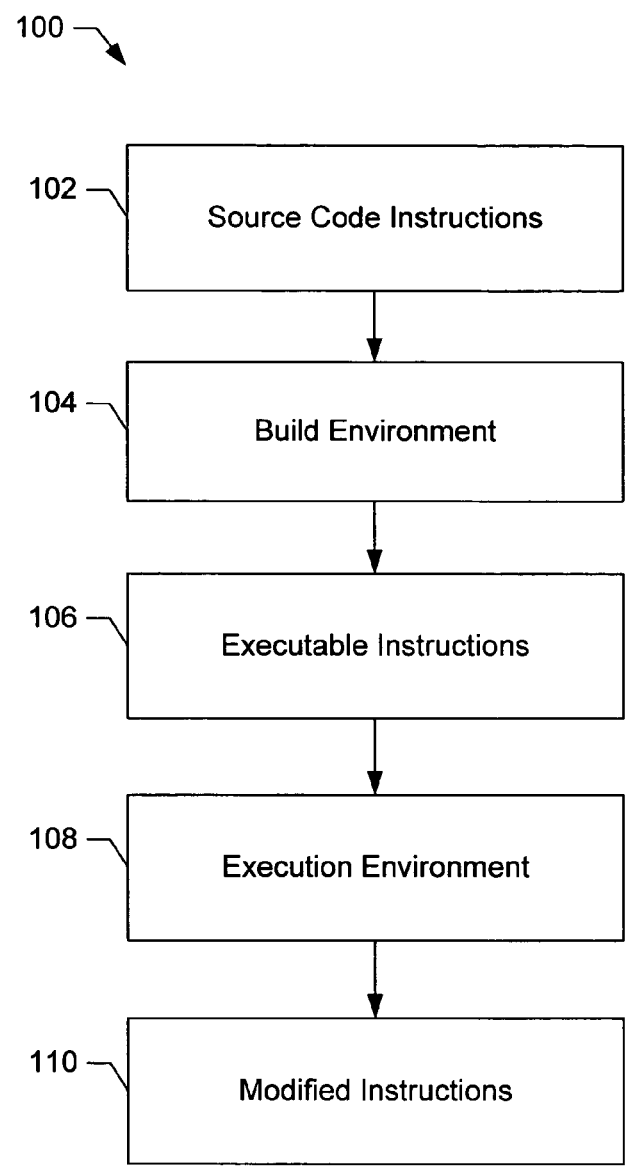
FIG. 1 is a block diagram illustrating an example code execution system configured to create software basic block layouts.

FIG. 1 is a block diagram of an example code execution system 100 configured to create software basic block layouts. The code execution system 100 includes one or more source code instructions 102, a build environment 104, one or more executable instructions 106, an execution environment 108, and one or more modified instructions 110.

The source code instructions 102 may be machine accessible instructions written in a computer programming language such as C/C++, Java®, .NET®, practical extraction and reporting language (PERL), assembly language, or any other suitable programming language. The source code instructions 102 are used as an input to the build environment 104.

The build environment 104 may be one or more applications (e.g., the applications 1411 of FIG. 14) that are executed to compile or assemble the source code instructions 102 into the executable instructions 106. For example, the build environment 104 may be an assembler, a C/C++ compiler, a Java compiler, a J#® compiler, a .NET compiler, or any other suitable compiler or assembler.

The executable instructions 106 may be instructions that are directly or indirectly executable on the hardware of a computer or processor system. For example, the executable instructions 106 may be compiled machine-level instructions or may be compiled intermediate language instructions, such as Java byte codes, .NET Microsoft® Intermediate Language (MSIL), PERL byte codes, etc.

The execution environment 108 may be one or more applications (e.g., the applications 1411 of FIG. 14) that invoke and/or analyze the executable instructions 106 to create the modified instructions 110. An implementation of the execution environment 108 is described in greater detail below in conjunction with FIG. 2.

The modified instructions 110 may be instructions that are executable or that can be assembled, compiled, or interpreted to be in an executable form. The modified instructions 110 may be executed to perform a similar or identical function to the executable instructions 106 but are typically laid out in a memory to enable a faster and/or more efficient execution of the instructions.

Figure 2:
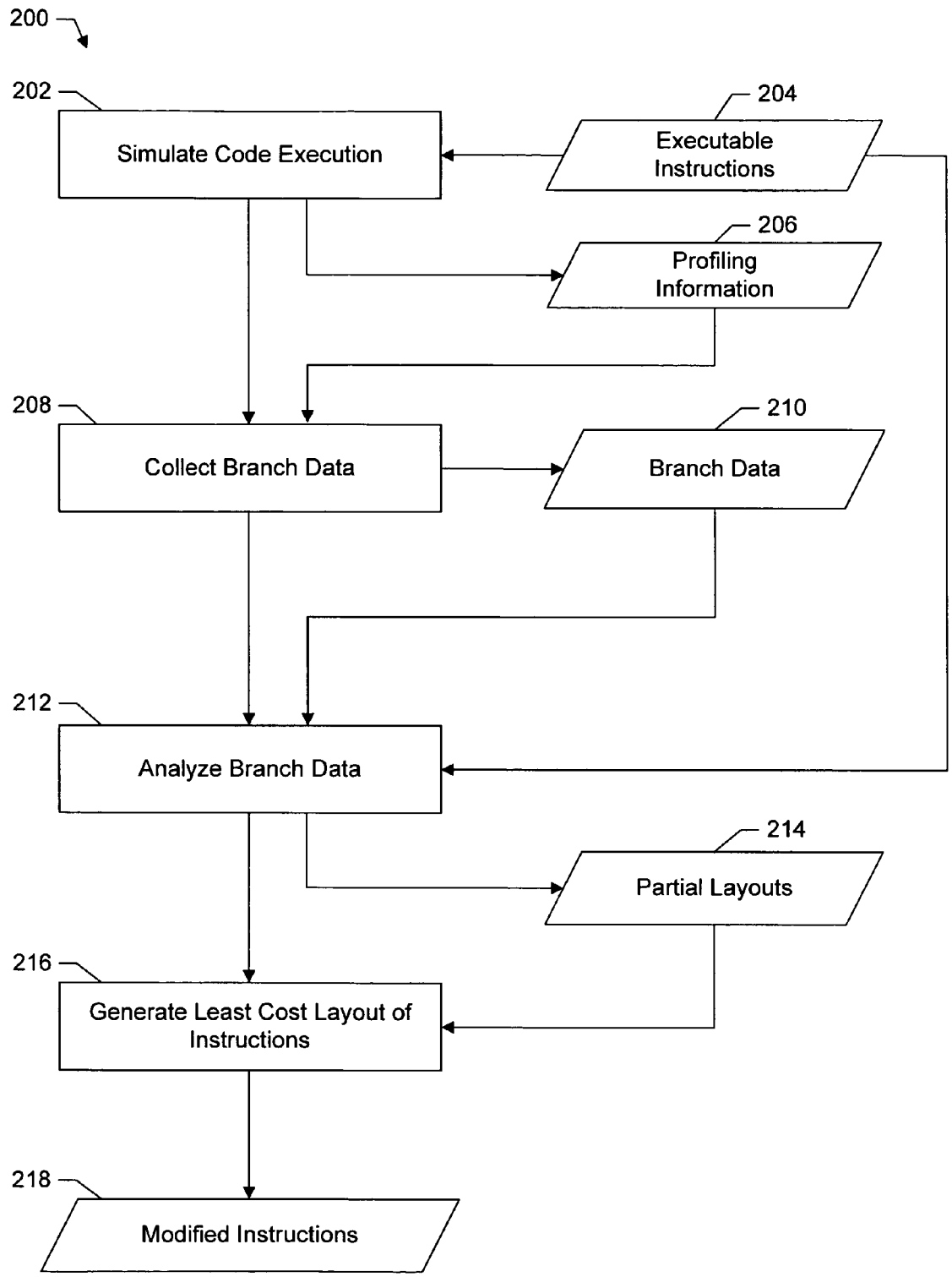
FIG. 2 is a flow diagram of an example implementation of the execution environment of FIG. 1 according to an embodiment.

FIG. 2 is a flow diagram of an example implementation 200 of the execution environment 108 of FIG. 1. The example implementation 200 depicts one manner in which a processor (e.g., the processor 1403 of FIG. 14) employing static branch prediction may be configured to generate one or more modified instructions (e.g., the modified instructions 110 of FIG. 1) via basic block layouts. The example implementation 200 may be embodied in one or more software programs, which are stored in one or more memories and executed by one or more processors in a well-known manner.

The example implementation 200 includes a simulate code execution process 202, one or more executable instructions 204, profiling information 206, a collect branch data process 208, a branch data collection 210, an analyze branch data process 212, one or more partial layouts 214, a generate least cost layout of instructions process 216, and one or more modified instructions 218. As is known to those having ordinary skill in the art, the simulate code execution process 202, collect branch data process 208, the analyze branch data process 212, and the generate least cost layout of instructions process 216 may be executed in the order shown in FIG. 2 and may be implemented as one or more compiler executions, one or more software programs, and/or any other suitable process or combination of processes.

Figure 14:
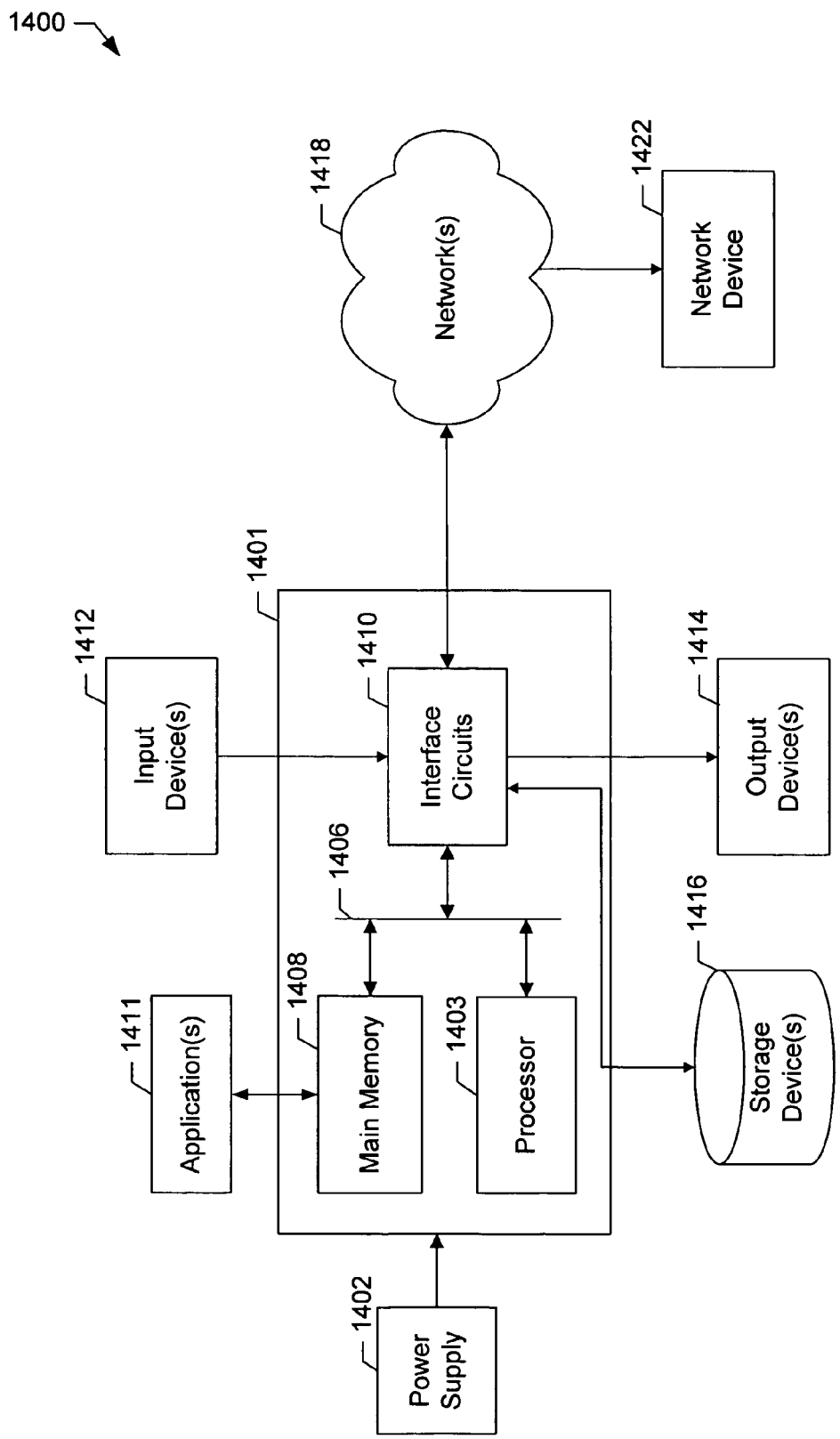
FIG. 14 is a block diagram of an example processor system with which the example methods and apparatus disclosed herein may be implemented.

The example implementation 200 also involves the plurality of input and/or output entities 204, 206, 210, 214, and 218 that may be used by the processes and which may be implemented using one or more files and/or one or more internal representations stored in a memory (e.g., the main memory device 1408 of FIG. 14). As described in greater detail below, the example implementation 200 transforms the executable instructions 204, which are similar or identical to the executable instructions 106 of FIG. 1, into the modified instructions 218.

Now turning in detail to FIG. 2, the simulate code execution process 202 receives as an input the executable instructions 204 for which optimization is desired. The simulate code execution process 202 then creates the profiling information 206 that may include the frequencies with which paths or branches associated with the executable instructions 204 are taken. For example, the profiling information 206 may be implemented as a file having a field that is associated with a program counter address and a field that is associated with the number of times in a given time period, the rate, or the frequency at which the program counter address was loaded by the processor. The simulate code execution process 202 may be a well-known technique for generating profiling information 206, such as, for example, an instruction-set simulator that executes application programs (e.g., the executable instructions 204) in a controlled environment.

The profiling information 206 may be used as an input to the collect branch data process 208, which creates the branch data collection 210. The branch data collection 210 may include the frequency of execution of branch instructions and the location of the branch instructions (e.g., the program counter value associated with the branch instructions). The branch data collection 210 may be implemented as a text file, a binary file, an internal representation, etc. For example, the collect branch data process 208 may create the branch data collection 210 by, for example, filtering extraneous data from the profiling information 206 or using other well-known techniques.

The branch data collection 210 may be used as an input to the analyze branch data process 212, which creates the partial layouts 214. The partial layouts 214 may be basic blocks (e.g., the software basic blocks described in conjunction with FIGS. 3A and 3B) arranged to be stored in a memory in a particular manner to achieve a desired execution sequence or flow. Example partial layouts are described in greater detail below in conjunction with FIGS. 6, 7, and 8. The partial layouts 214 may be created by selectively inserting basic blocks into one or more of the plurality of partial layouts 214. An example analyze branch data process 212 is described in greater detail below in conjunction with FIG. 9.

The generate least cost layout of instructions process 216 selectively combines the inputs (i.e., the partial layouts 214) to form the respective modified instructions 218. One method for implementing the generate least cost layout of instructions process 216 is described in greater detail below in conjunction with FIG. 12. The modified instructions 218 may be similar or identical to the modified instructions 110 of FIG. 1.

Before discussing the example implementation of the processes and other entities depicted in FIG. 2 in greater detail, a discussion of control flow graphs and layouts of basic blocks in a memory is provided below. In general, a hierarchical relationship among a plurality of basic blocks may be represented by a control flow graph (e.g., a control flow graph 300 of FIG. 3A) including nodes and edges, where the nodes represent basic blocks and the edges represent paths (i.e., branch instructions) between the basic blocks. Additionally, as described in greater detail below, a plurality of interrelated basic blocks may be laid out in a desired manner to form a contiguous machine executable as depicted, for example, in FIG. 3B.

Figures 3A, 3B:
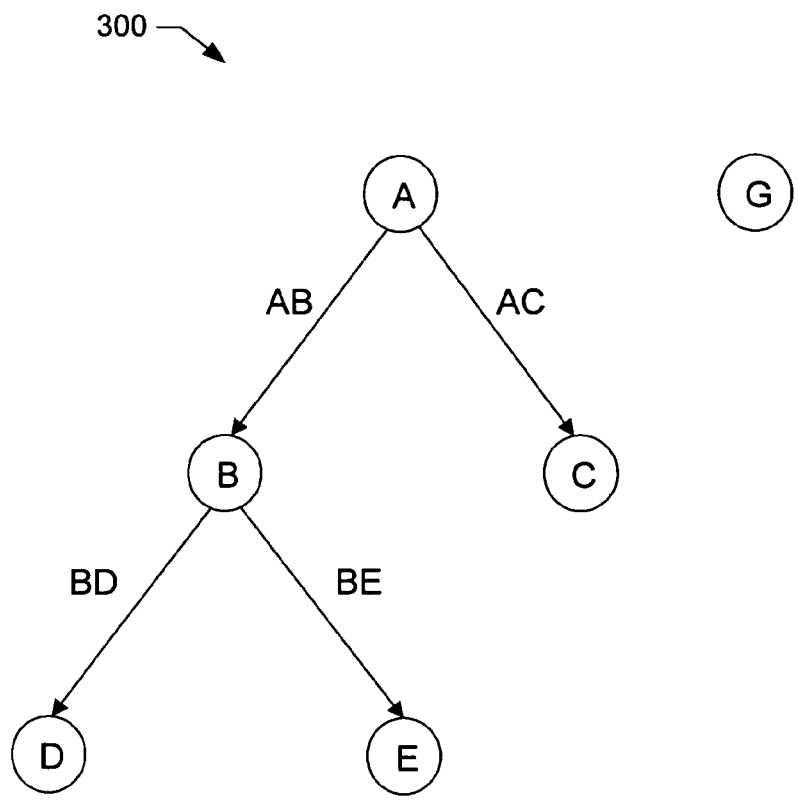
FIG. 3A is an example control flow graph that depicts the logical relationships among a plurality of basic blocks.
FIG. 3B is an example sequential memory location representation of a basic block layout of the basic blocks of FIG. 3A prior to modification.

FIG. 3A depicts a control flow graph 300 of basic blocks representing a machine executable (e.g., the executable instructions 204 of FIG. 2). In general, control flow graphs may be used to represent the basic blocks and branches between basic blocks found in a machine executable. In particular, nodes of a control flow graph may represent basic blocks and edges of a control flow graph may represent branch instructions for transitioning between or logically interrelating or linking the basic blocks. For example, the control flow graph 300 includes a plurality of basic blocks (i.e., basic blocks A, B, C, D, E, and G) and a plurality of edges (i.e., edges AB, AC, BD, and BE). In the example of FIG. 3A, the basic blocks A, B, C, D, and E form a tree-type data structure having a basic block G that is not linked to the other blocks through a call flow. It should be understood that the basic block G could instead be any sub-control flow graph including a plurality of basic blocks that could be laid out between, for example, along any edge (e.g., between blocks A and B). The basic blocks A, B, C, D, E, and G of the control flow graph 300 may be divided or decomposed into a plurality of partial layouts via the analyze branch data process 212 of FIG. 2. For example, a partial layout AGBC may be formed from the basic blocks A, B, C, and G. As described in greater detail herein in conjunction with block 216 of FIG. 2, the partial layouts are then analyzed using cost metrics (e.g., an example cost metric is described in conjunction with FIG. 8) to identify a new least cost substantial layout.

FIG. 3B depicts a contiguous memory representation (e.g., a memory map) of a substantial layout 310 prior to modification. The substantial layout 310 is a sequentially ordered grouping of machine accessible instructions that are stored in memory in a particular manner to achieve a desired execution flow. For example, the substantial layout 310 may be stored in one or more files on the storage device 1416 of FIG. 14, a portion of memory on the main memory device 1408 of FIG. 14, or any other suitable memory device.

The substantial layout 310 includes a plurality of basic blocks A, B, C, D, E, and G having an ordering (i.e., A, B, C, D, E, and G) that has typically been assigned by a build environment (e.g., the build environment 104 of FIG. 1). The ordering of basic blocks is important for increasing instruction throughput because a well ordered basic block layout typically executes with fewer pipeline stalls than a poorly ordered basic block layout.

Figure 4:
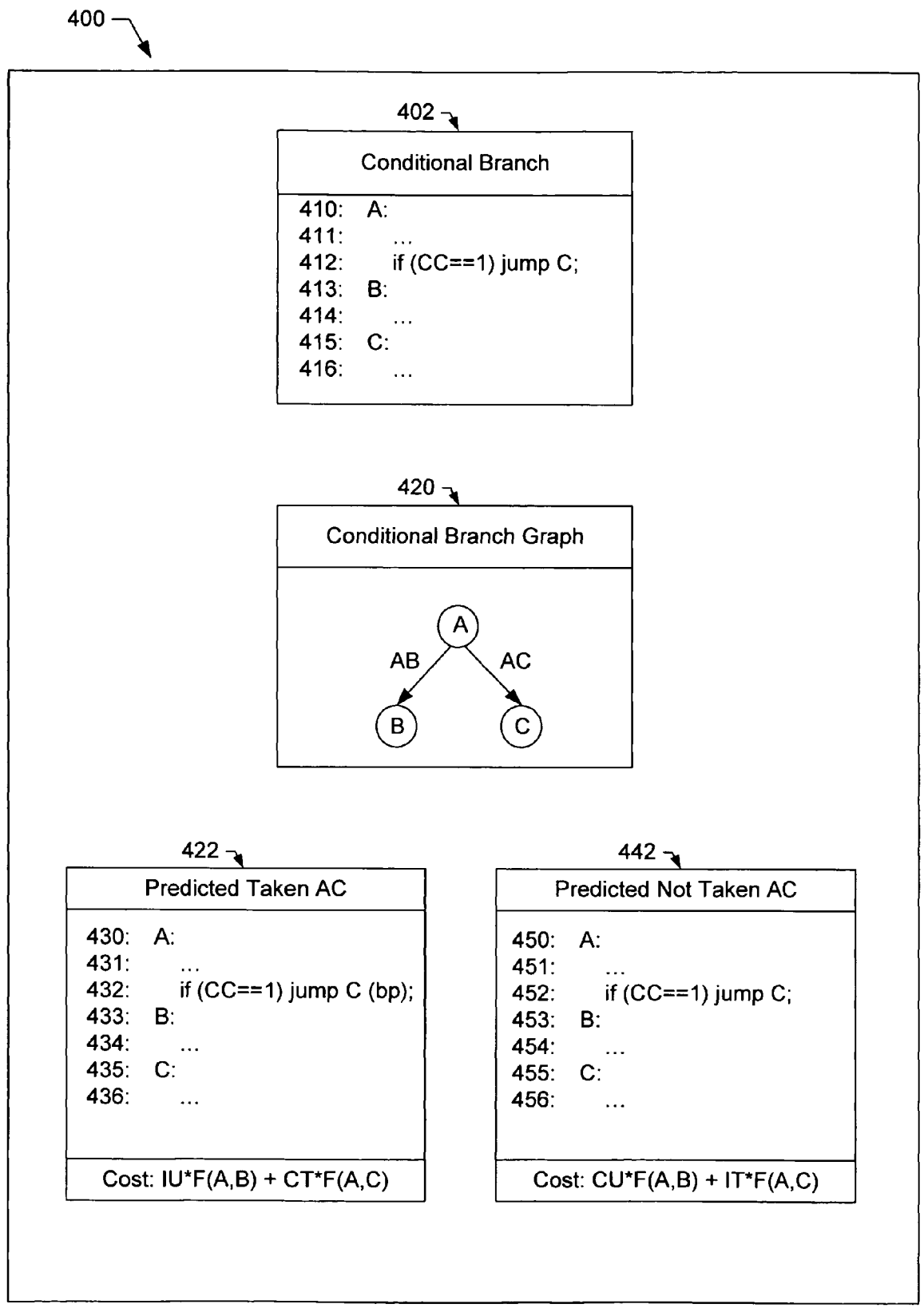
FIG. 4 is an example conditional branch scenario associated with a group of basic blocks.

FIG. 4 is an example conditional branch scenario 400 associated with a group of basic blocks (i.e., basic blocks A, B, and C). The conditional branch scenario 400 includes a conditional branch 402 having a plurality of machine accessible instructions 410-416. The conditional branch 402 is an example implementation of the executable instructions 106 of FIG. 1 prior to the execution environment 108 of FIG. 1. For clarity, the conditional branch 402 includes a plurality of labels A, B, and C that is used for illustrative purposes only and which is associated with the basic blocks A, B, and C, respectively.

The plurality of machine accessible instructions 410-416 includes a conditional branch instruction 412 having a CC flag that, when set, induces the processor execution to jump from basic block A to basic block C. Conversely, when the CC flag is not set the processor execution falls through from basic block A to basic block B.

The logical relationship and/or execution flow between the basic blocks A, B, and C is depicted in a control flow graph 420. The control flow graph 420 includes a plurality of basic blocks A, B, and C, an edge connecting the basic block A to the basic block B (i.e., an edge AB), and an edge connecting the basic block A to the basic block C (i.e., an edge AC). For example, the edge AB is created by the fall-through condition and the edge AC is created by the jump invocation condition as described above in conjunction with the conditional branch 402.

The conditional branch scenario 400 also includes a basic block layout 422 having a plurality of machine accessible instructions 430-436 and an associated cost expression, and a basic block layout 442 having a plurality of instructions 450-456 and an associated cost expression. The basic block layouts 422 and 442 represent a similar or identical layout of the basic blocks corresponding to the nodes in the control flow graph 420. The layout 422 differs from the layout 442 in that the layout 422 depicts a correctly predicted branch taken from basic block A to basic block C, while the layout 442 depicts an incorrectly predicted branch taken from basic block A to basic block C. Further distinctions between layouts 422 and 442 include the branch predictor (bp) indicator associated with a conditional jump instruction 432 and the different cost expressions associated with each of the layouts 422 and 442.

The bp indicator of the conditional jump instruction 432 indicates to a processor (e.g., the processor 1403) that the conditional jump instruction 432 has been profiled (e.g., by the simulate code execution process 202) and is predicted (e.g., by the analyze branch data process 212) to typically be taken. For example, the processor 1403 may use the bp indicator to further optimize instructions modified by the example implementation 200 of FIG. 2 during runtime. Additionally, the bp indicator may be implemented as a bit or flag on the processor 1403.

Before describing the cost expressions associated with each of the layouts 422 and 442 in greater detail, some additional terms are defined below. For example, the cost expressions include variables, such as CT, CU, IT, IU, and U and a method F. The variables CT, CU, IT, IU, and U are described in the branch penalty table (TABLE 1) below.

TABLE 1

| Prediction and (Un)Conditional | Taken | Untaken |
| --- | --- | --- |
| Conditional Correctly Predicted | CT | CU |
| Conditional Incorrectly Predicted | IT | IU |
| Unconditional | U | — |

The branch penalty table (TABLE 1) contains penalties (i.e., costs) associated with correct/incorrect branch predictions and taken/untaken branches. The penalties depend on the type of pipeline processor used and may include a cost of flushing a pipeline if a branch is incorrectly predicted. A first column of the branch penalty table contains categories associated with correctly or incorrectly predicting a branch. Second and third columns of the branch penalty table contain categories associated with taking a branch (i.e., executing a branch instruction) or not taking a branch (i.e., not executing a branch instruction).

The cost variables associated with the example branch penalty table are: CT, which is a penalty or cost associated with correctly predicting execution of a branch and taking the branch; CU, which is a penalty or cost associated with correctly predicting execution of a branch and not taking the branch; IT, which is a penalty or cost associated with incorrectly predicting execution of a branch and taking the branch; IU, which is a penalty or cost associated with incorrectly predicting execution of a branch and not taking the branch; and U, which is a penalty or cost associated with taking an unconditional branch. While the cost variables are described as being variables, the variables may be implemented as a software variable, a software constant, a built-in value, or any other suitable data storage mechanism.

The method F is performed to determine a frequency of execution associated with a branch instruction from a first basic block to a second basic block. For example, the method F may be applied to the basic blocks in FIG. 3A to calculate the frequency of execution associated with the edge AB of the control flow graph 420 (i.e., to determine frequency with which processor execution follows the edge AB). In such a case, the method F may be expressed as F(A, B).

The cost expression associated with the basic block layout 422 may be represented as IU*F(A, B)+CT*F(A, C). IU, as discussed above in conjunction with the branch penalty table (TABLE 1), is the penalty or cost associated with incorrectly predicting execution of an untaken branch. The function F(A, B) is the frequency of execution of the edge AB. Additionally, CT is the cost associated with correctly predicting execution of a taken branch. The function F(A, C) is the frequency of execution of the edge AC. Thus, IU*F(A, B) is associated with a cost of an incorrectly predicted branch not taken by the edge AC (i.e., falling through to the edge AB). Similarly, CT*F(A, C) is associated with a cost of a correctly predicted branch taken by (i.e., jumping via) the edge AC. Accordingly, IU*F(A, B)+CT*F(A, C) represents the cost associated with the basic block layout 422.

The cost expression associated with the basic block layout 442 may be represented as CU*F(A, B)+IT*F(A, C). CU, as discussed above in conjunction with the branch penalty table (TABLE 1), is the penalty or cost associated with correctly predicting execution of an untaken branch. The function F(A, B) is the frequency of execution of the edge AB. Additionally, IT is the cost associated with incorrectly predicting execution of a taken branch. The function F(A, C) is the frequency of execution of the edge AC. CU*F(A, B) is associated with a cost of a correctly predicted branch not taken by the edge AC (i.e., falling through to the edge AB). IT*F(A, C) is associated with a cost of an incorrectly predicted branch taken by (i.e., jumping via) the edge AC. Accordingly, CU*F(A, B)+IT*F(A, C) represents the cost of the basic block layout 442.

Figure 5:
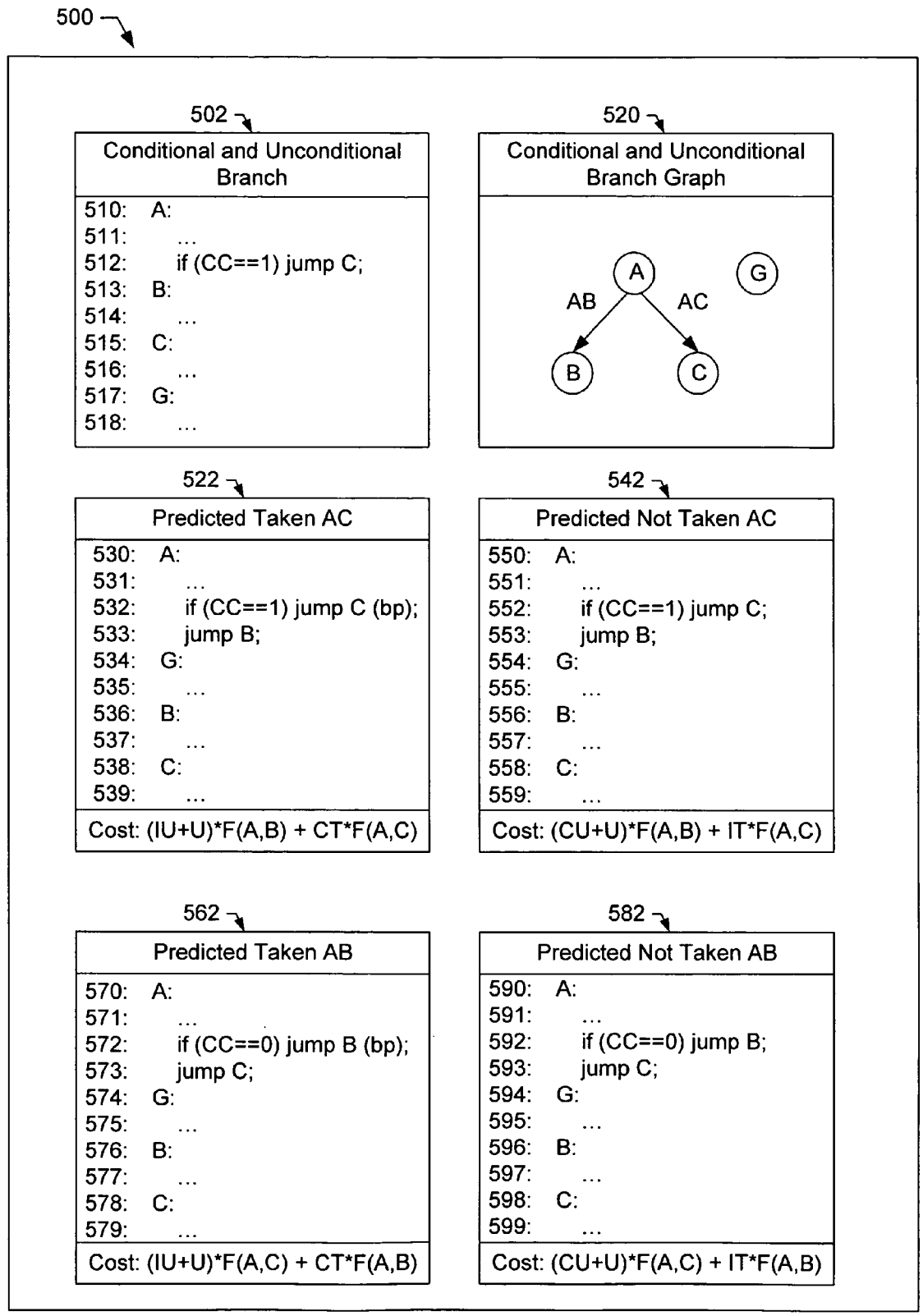
FIG. 5 is an example conditional and unconditional branch combination scenario associated with a group of basic blocks.

FIG. 5 depicts an example conditional and unconditional branch combination scenario 500 including a conditional and unconditional branch 502 having a plurality of machine accessible instructions 510-518. The conditional and unconditional branch 502 is an example implementation of the executable instructions 106 of FIG. 1 prior to the execution environment 108 of FIG. 1. For clarity, the conditional and unconditional branch 502 includes a plurality of labels A, B, C, and G that are used for illustrative purposes only and which are associated with a plurality of basic blocks A, B, C, and G, respectively, described in greater detail below.

The plurality of machine accessible instructions 510-518 includes a conditional branch instruction 512 having a CC flag that is similar to the CC flag described in greater detail above in conjunction with the conditional branch instruction 412 of FIG. 4.

The logical and/or execution flow relationships between the basic blocks A, B, C, and G are depicted in a control flow graph 520. The control flow graph 520 includes a plurality of basic blocks A, B, C, and G and a plurality of edges connecting the basic block A to the basic block B (i.e., an edge AB), and the basic block A to the basic block C (i.e., an edge AC). For example, the edge AB is created by the fall-through condition and the edge AC is created by the jump invocation condition as described above in conjunction with the conditional and unconditional branch 502. Again, it should be recognized that basic block G could alternatively be a plurality of interrelated basic blocks that could be laid out along any of the edges associated with blocks A, B and C.

The conditional and unconditional branch scenario 500 also includes a basic block layout 522 having a plurality of machine accessible instructions 530-539 and an associated cost expression, a basic block layout 542 having a plurality of machine accessible instructions 550-559 and an associated cost expression, a basic block layout 562 having a plurality of machine accessible instructions 570-579 and an associated cost expression, and a basic block layout 582 having a plurality of machine accessible instructions 590-599 and an associated cost expression. The layout 522 differs from the other layouts 542, 562, and 582 in that the layout 522 depicts a correctly predicted branch taken from basic block A to basic block C, while the layout 542 depicts an incorrectly predicted branch taken from basic block A to basic block C. Additionally, the layout 562 depicts a correctly predicted branch taken from basic block A to basic block B, and the layout 582 depicts an incorrectly predicted branch taken from basic block A to basic block B. A further distinction between the basic block layouts 522, 542, 562, and 582 are the bp indicators associated with a plurality of conditional jump instructions 532, 552, 572, and 592, the conditional configuration of the conditional jump instructions 532, 552, 572, and 592, a plurality of unconditional jump instructions 533, 553, 573, and 593, and the different cost expressions associated with each of the basic block layouts 522, 542, 562, and 582.

Prior to execution of the conditional jump instructions 532 or 552 during run-time, the basic block C is loaded into the pipeline. Accordingly, efficiency gains may be achieved by arranging the conditional jump instructions 532 or 552 to branch to the basic block C where the edge AC is more frequently predicted to be taken than the edge AB. Conversely, if the edge AB is more frequently predicted to be taken than the edge AC, the conditional jump instructions 572 or 592 may result in improved execution efficiency.

The cost expression associated with the basic block layout 522 may be represented as (IU+U)*F(A, B)+CT*F(A, C). IU and U, as discussed above in conjunction with the branch penalty table (TABLE 1), is the penalty or cost associated with incorrectly predicting execution of an untaken branch and unconditionally taking a branch and the function F(A, B) is the frequency of execution of the edge AB. Additionally, CT is the cost associated with correctly predicting execution of a taken branch and the function F(A, C) is the frequency of execution of the edge AC. Thus, (IU+U)*F(A, B) is associated with a cost of an incorrectly predicted branch not taken by the edge AC in addition to (i.e., plus) the cost of unconditionally taking the edge AB (i.e., jumping to the edge AB). Also, CT*F(A, C) is associated with a cost of a correctly predicted branch taken by (i.e., jumping via) the edge AC. Accordingly, (IU+U)*F(A, B)+CT*F(A, C) represents the cost of the basic block layout 522.

The cost expression associated with the basic block layout 542 may be represented as (CU+U)*F(A, B)+IT*F(A, C). CU and U, as discussed above in conjunction with the branch penalty table (TABLE 1), is the penalty or cost associated with correctly predicting execution of an untaken branch and unconditionally taking a branch and the function F(A, B) is the frequency of execution of the edge AB. Additionally, IT is the cost associated with incorrectly predicting execution of a taken branch and the function F(A, C) is the frequency of execution of the edge AC. Thus, (CU+U)*F(A, B) is associated with a cost of a correctly predicted branch not taken by the edge AC in addition to the cost of unconditionally taking the edge AB (i.e., jumping to the edge AB). Similarly, IT*F(A, C) is associated with a cost of an incorrectly predicted branch taken by (i.e., jumping via) the edge AC. Accordingly, (CU+U)*F(A, B)+IT*F(A, C) represents the cost of the basic block layout 542.

The cost expression associated with the basic block layout 562 may be represented as (IU+U)*F(A, C)+CT*F(A, B). IU and U, as discussed above in conjunction with the branch penalty table (TABLE 1), is the penalty or cost associated with incorrectly predicting execution of an untaken branch and unconditionally taking a branch and the function F(A, C) is the frequency of execution of the edge AC. Additionally, CT is the cost associated with correctly predicting execution of a taken branch and the function F(A, B) is the frequency of execution of the edge AB. Thus, (IU+U)*F(A, C) is associated with a cost of an incorrectly predicted branch not taken by the edge AB in addition to the cost of unconditionally taking the edge AC (i.e., jumping to the edge AC). Similarly, CT*F(A, B) is associated with a cost of a correctly predicted branch taken by (i.e., jumping via) the edge AB. Accordingly, (IU+U)*F(A, C)+CT*F(A, B) represents the cost of the basic block layout 562.

The cost expression associated with the basic block layout 582 may be represented as (CU+U)*F(A, C)+IT*F(A, B). CU and U, as discussed above in conjunction with the branch penalty table (TABLE 1), is the penalty or cost associated with correctly predicting execution of an untaken branch and unconditionally taking a branch and the function F(A, C) is the frequency of execution of the edge AC. Additionally, IT is the cost associated with incorrectly predicting execution of a taken branch and the function F(A, B) is the frequency of execution of the edge AB. Thus, (CU+U)*F(A, C) is associated with a cost of an incorrectly predicted branch not taken by the edge AB in addition to the cost of unconditionally taking the edge AC (i.e., jumping to the edge AC). Similarly, IT*F(A, B) is associated with a cost of an incorrectly predicted branch taken by (i.e., jumping via) the edge AB. Accordingly, (CU+U)*F(A, C)+IT*F(A, B) represents the cost of the basic block layout 582.

Figure 6:
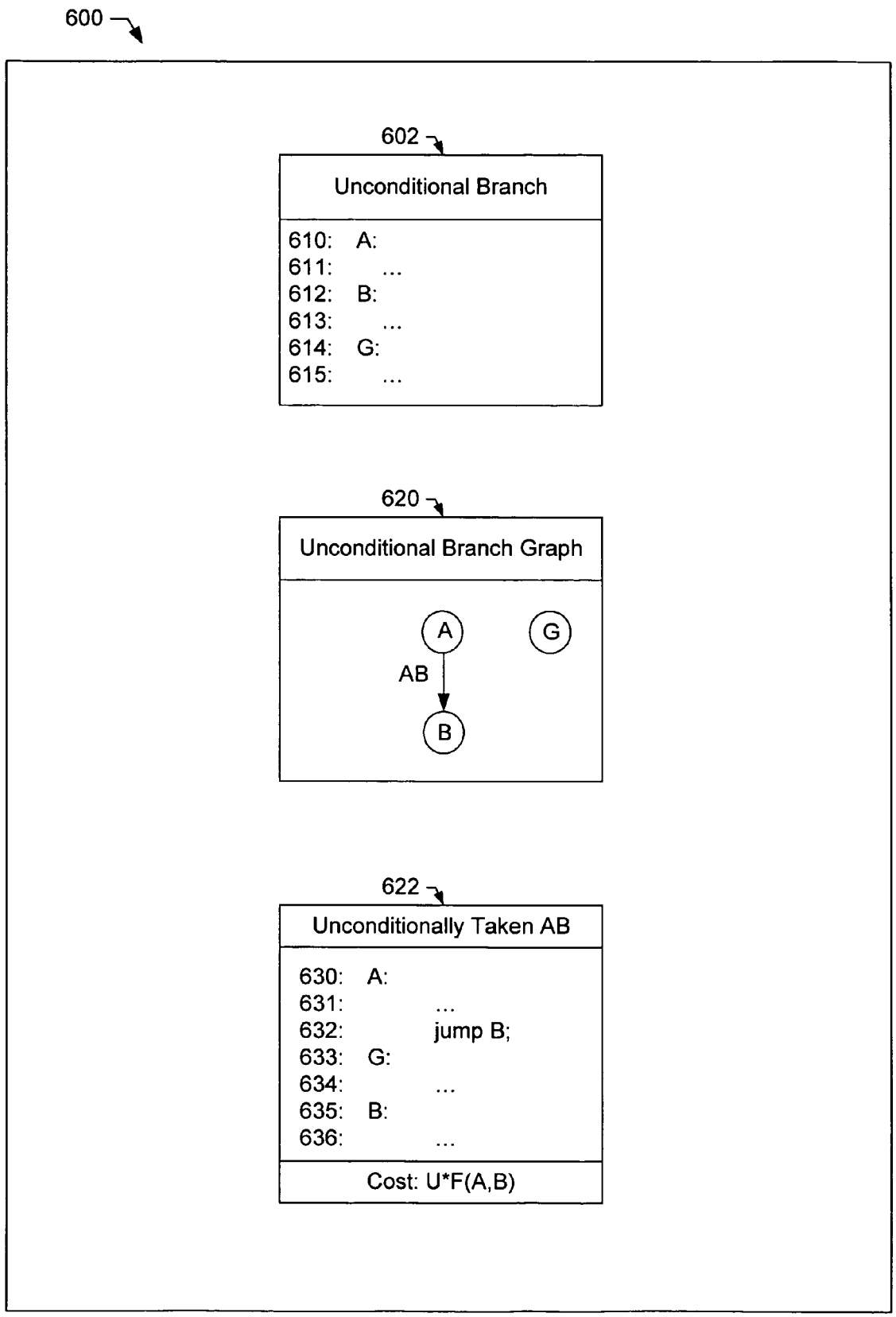
FIG. 6 is an example unconditional branch scenario associated with basic blocks.

FIG. 6 depicts an example unconditional branch scenario 600 including an unconditional branch 602 having a plurality of machine accessible instructions 610-615. The unconditional branch 602 is an example implementation of the executable instructions 106 of FIG. 1 prior to the execution environment 108 of FIG. 1. For clarity, the unconditional branch 602 includes a plurality of labels A, B, and G that are used for illustrative purposes only and which are associated with a plurality of basic blocks A, B, and G respectively, described in greater detail below. As previously noted, the basic block G could instead be a plurality of interrelated basic blocks suitable to be laid out between blocks A and B.

The logical and/or execution flow relationships between the basic blocks A, B, and G are depicted in a control flow graph 620. The control flow graph 620 includes a plurality of basic blocks A, B, and G and an edge connecting the basic block A to the basic block B (i.e., an edge AB). For example, the edge AB is created by a fall-through condition as described in greater detail above in conjunction with the unconditional branch 602.

The unconditional branch scenario 600 also includes a basic block layout 622 having a plurality of machine accessible instructions 630-636 and an associated cost expression. The plurality of machine accessible instructions 630-636 includes an unconditional jump instruction 632. The unconditional jump instruction 632 is inserted into the plurality of machine accessible instructions 630-636 by the analyze branch data process 212 of FIG. 2 to maintain a control flow such as that depicted in the control flow graph 620.

The cost expression associated with the basic block layout 622 is U*F(A, B). The variables and functions associated with the layout 622 are U and F(A, B). The variable U, as described above in conjunction with the branch penalty table (TABLE 1), is the penalty or cost associated with unconditionally taking the edge AB. The function F(A, B) returns a frequency of execution associated with executing a branch from the basic block A to the basic block B.

Figure 7:
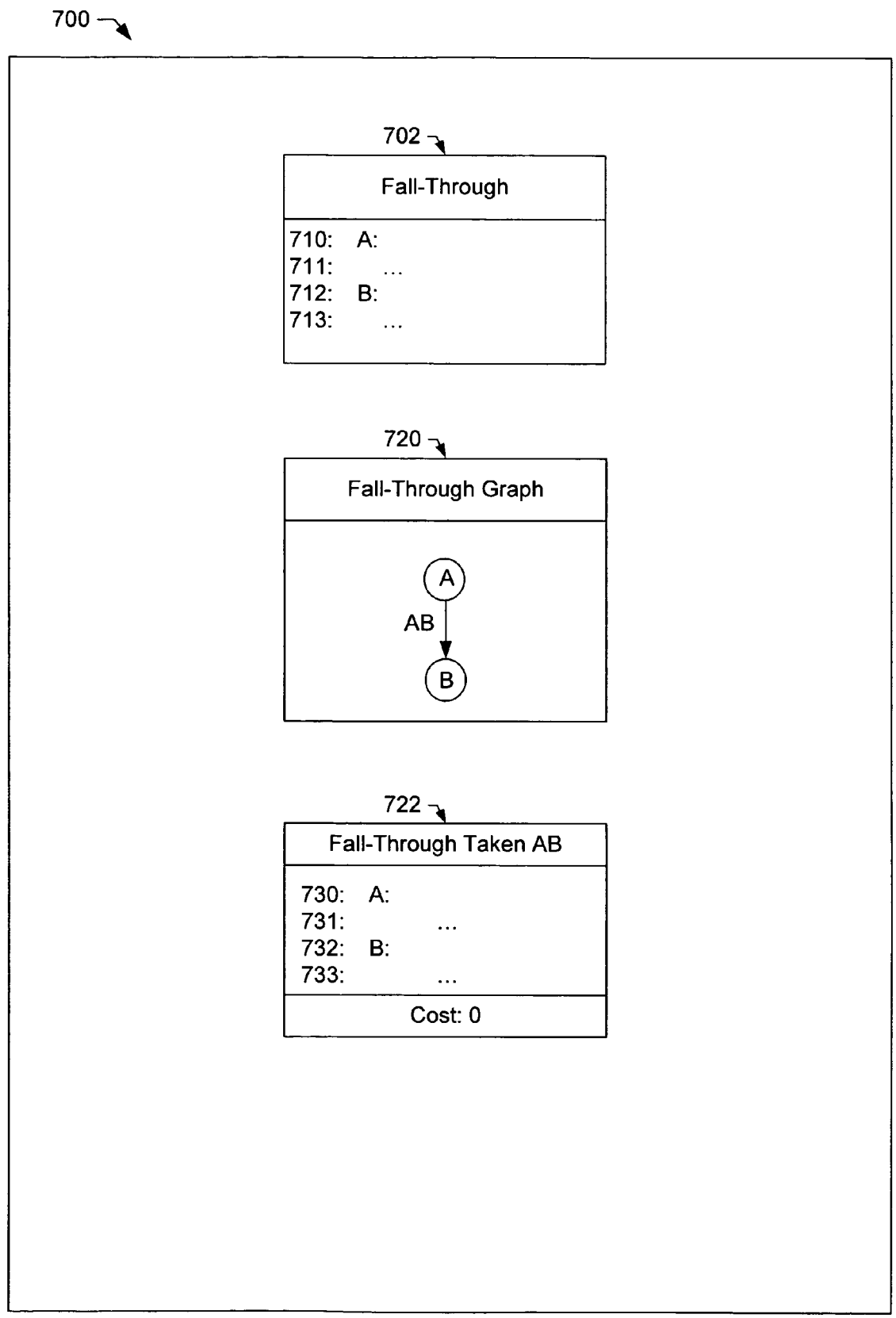
FIG. 7 is an example fall-through scenario associated with basic blocks.

FIG. 7 depicts an example fall-through scenario 700 including a fall-through 702 having a plurality of machine accessible instructions 710-713. The fall-through 702 is an example implementation of the executable instructions 106 of FIG. 1 prior to the execution environment 108 of FIG. 1.

The logical and/or execution flow relationships between the basic blocks A and B are depicted in a control flow graph 720. The control flow graph 720 includes a plurality of basic blocks A and B and an edge connecting the basic block A to the basic block B (i.e., an edge AB). For example, the edge AB is created by a fall-through condition as described in greater detail above in conjunction with the unconditional branch 702.

The fall-through scenario 700 also includes a basic block layout 722 having a plurality of machine accessible instructions 730-733 and an associated cost expression. The fall-through 702 and the basic block layout 722 illustrate contiguous layouts of the basic block A and the basic block B that require no branch instruction to transition from the basic block A to the basic block B. The cost expression associated with the basic block layout 722 has a value of zero because there is no cost to the fall-through operation.

FIG. 8A depicts example pseudo code 800 that includes iterative invocation instructions 802 and 804 that may be used to invoke a cost function (e.g., a cost function 808 of FIG. 8B) to calculate the cost of partial layouts (e.g., the partial layouts 214 of FIG. 2). The iterative invocation instructions 802 and 804 utilize a variable $v_i$ and a variable $v_{i+1}$, which are passed to the cost function 808 and which are associated with consecutive basic blocks.

FIG. 8B depicts example pseudo code of the cost function 808 that may be used to calculate a cost metric for a layout of basic blocks. The cost function 808 includes a cost function signature instruction 810, a function begin instruction 812, a plurality of conditional instructions 814, 824, 838, and 842, a plurality of min function invocation instructions 816, 822, and 826, 836, a plurality of cost expression instructions 818, 820, 828, 830, 832, 834, 840, and 844, a return instruction 846, and a function end instruction 848.

The cost function signature instruction 810 includes a parameter p1 (associated with the variable $v_i$ of 802 of FIG. 8A) and a parameter p2 (associated with the variable $v_{i+1}$ of 802 of FIG. 8A). The variables and parameters are used by the cost function signature instruction 810 and may be passed to the example cost function 808 using the iterative invocation instructions 802 and 804 of FIG. 8A. The function begin instruction 812 and the function end instruction 848 define potential boundaries of the cost function 808.

The conditional instructions 814, 824, 838, and 842 determine which of the cost expression instructions 818, 820, 828, 830, 832, 834, 840, and 844 are applicable to the parameters. Before describing the conditional instructions 814, 824, 838, and 842 and the cost expression instructions 818, 820, 828, 830, 832, 834, 840, and 844 in greater detail, some additional terms are defined below. For example, the cost expression instructions 818, 820, 828, 830, 832, 834, 840, and 844 include variables, such as the variables IT, CU, CT, and IU and methods, such as F, min, and out-degree. The variables IT, CU, CT, and IU and the method F are described above in conjunction with FIG. 4.

The method min determines a minimum value between a plurality of values. For example, in the case where the method min is invoked as min(1, 2, 3, 4), the value one is returned as the minimum value. While the method min is described as receiving and returning integer values, many different values may be used, such as floating point values, pointer values to structures, reference values to classes, etc.

The method out-degree determines the number of outgoing or destination edges associated with (e.g., connected to) a basic block. For example, the method out-degree may be applied to one or more basic blocks in FIG. 3A to calculate the number of edges associated with the basic block A of FIG. 3A. In such a case, the method out-degree may be expressed as out-degree(A) and returns the value two because the basic block A of FIG. 3A has two out-going edges (i.e., edges AB and AC of FIG. 3A).

Returning to the conditional instructions 814, 824, 838, and 842 and the cost expression instructions 818, 820, 828, 830, 832, 834, 840, and 844, the conditional instruction 814 is associated with the cost expression instructions 818 and 820, which are encapsulated in the min function invocation instruction 816, 822. The conditional instruction 814 expresses in symbolic logic that the instructions 816, 818, 820, and 822 are performed if there exists an edge (p1, p2) and a basic block X, such that an edge (p1, X) exists and X is not the same basic block as p2.

For example, given the basic block layouts 422 and 442 of FIG. 4 (i.e., a partial layout with an ordering of the basic blocks A, B, and C), where the parameter p1 corresponds to the basic block A, the parameter p2 corresponds to the basic block B, and a basic block X corresponds to the basic block C, the conditional instruction 814 will evaluate to be true because there exists an edge AB and there exists a basic block C, such that an edge AC exists and C is not the same basic block as B.

The min function invocation instruction 816, 822 returns the minimum of the two cost expression instructions 818 and 820 and the return value is inserted into a local result variable (i.e., a variable result), which is transmitted to the calling function (e.g., the iterative invocation instructions 802 and 804 of FIG. 8A) via the return instruction 846.

The cost expression instruction 818 is the cost expression associated with the layout 422 of FIG. 4 with the basic blocks A, B, and C, substituted into the cost expression instruction 818. Similarly, the cost expression instruction 820 represents the cost expression associated with the layout 442 of FIG. 4 with the basic blocks A, B, and C substituted into the cost expression instruction 820. Accordingly, either the cost expression instruction 818 or the cost expression instruction 820 may be determined to be the cost expression instruction providing the minimum cost via the min function invocation instruction 816, 822. The partial layout (i.e., the basic block layout 422 or the basic block layout 442) associated with the cost expression providing a minimum cost may then be inserted into a substantial layout. The insertion or combination of partial layouts to form a substantial layout is described in greater detail below in conjunction with block 1206 of FIG. 12.

The conditional instruction 824 is associated with the cost expression instructions 828, 830, 832, and 834 encapsulated by the min function instruction 826, 836. The conditional instruction 824 expresses in symbolic logic that the instructions 826, 828, 830, 832, 834, and 836 are performed if there does not exist an edge (p1, p2) and there exists a basic block X and a basic block Z, such that an edge (p1, X) exists, an edge (p1, Z) exists, and the basic block X is not the same basic block as the basic block Z.

For example, given the basic block layouts 522, 542, 562, and 582 of FIG. 5 (i.e., a partial layout with an ordering of A, G, B, C), where the parameter p1 corresponds to the basic block A, the parameter p2 corresponds to the basic block G, a basic block X corresponds to the basic block B, and a basic block Z corresponds to the basic block C, the conditional instruction 824 evaluates to true. In particular, there does not exist an edge AG and there exists a basic block B and a basic block C, such that an edge AB exists, an edge AC exists, and the basic block B is not the same basic block as the basic block C.

The min function invocation instruction 826, 836 returns the minimum value resulting from the evaluation of the four cost expression instructions (i.e., the cost expression instructions 828, 830, 832, and 834) and the return value is inserted into a local result variable (i.e., a variable result), which is transmitted to the calling function (e.g., the iterative invocation instructions 802 and 804 of FIG. 8A) via the return instruction 846.

The cost expression instruction 828 is the cost expression associated with the layout 522 of FIG. 5 with the basic blocks A, B, C, and G substituted into the cost expression instruction 828. Similarly, the cost expression instructions 830, 832, and 834 are associated with the respective layouts 542, 562, and 582 of FIG. 5 with the basic blocks A, B, C, and G appropriately substituted for the variables of the cost expression instructions 830, 832, and 834. Accordingly, one of the cost expression instructions 828, 830, 832, or 834 is determined to be the cost expression instruction providing the minimum cost via the min function invocation instruction 826, 836. The partial layout associated with the cost expression providing a minimum cost may then be inserted into a substantial layout. The insertion or combination of partial layouts to form a substantial layout is described in greater detail below in conjunction with block 1206 of FIG. 12.

The conditional instruction 838 is associated with the cost expression instruction 840. The conditional instruction 838 expresses in symbolic logic that the cost expression instruction 840 is performed if there exists an edge (p1, X), there does not exist an edge (p1, p2), and the return value of out-degree(p1) equals 1.

For example, given the basic block layout 622 of FIG. 6 (i.e., a partial layout with an ordering of A, G, B), where the parameter p1 corresponds to the basic block A, the parameter p2 corresponds to the basic block G, and a basic block X corresponds to the basic block B, the conditional instruction 838 evaluates to true because there exists an edge AB, there does not exist an edge AG, and the return value of out-degree (A) equals 1.

The cost expression instruction 840 is the cost expression associated with the layout 622 of FIG. 6 with the basic blocks A and B substituted into the cost expression instruction 840. The partial layout associated with the cost expression instruction 840 may then be inserted into a substantial layout. The insertion or combination of partial layouts to form a substantial layout is described in greater detail below in conjunction with block 1206 of FIG. 12.

The conditional instruction 842 is associated with the cost expression instruction 844. The conditional instruction 842 expresses in symbolic logic that the cost expression instruction 844 is performed if there exists an edge (p1, p2), and the return value of out-degree(p1) equals 1.

For example, given the basic block layout 722 of FIG. 7 (i.e., a partial layout with an ordering of A, B) that has no edge AC, where the parameter p1 corresponds to the basic block A and the parameter p2 corresponds to the basic block B, the conditional instruction 842 evaluates to true because there exists an edge AB and the return value of out-degree(A) equals 1. Alternatively, the conditional instruction 842 could be implemented as an else statement rather than an else-if statement.

The cost expression instruction 844 shows a cost expression formula resulting in the value zero that is inserted into a local result variable (i.e., a variable result), which is transmitted to a calling function (e.g., the iterative invocation instructions 802 and 804 of FIG. 8A) in the return instruction 846.

While the code blocks 800 and 808 of FIGS. 8A and 8B are referred to as one or more functions having instructions, the code blocks 800 and 808 may be implemented using a macro, a constructor, a plurality of inline instructions, code, software, or any other programming construct or combination thereof.

Figure 9:
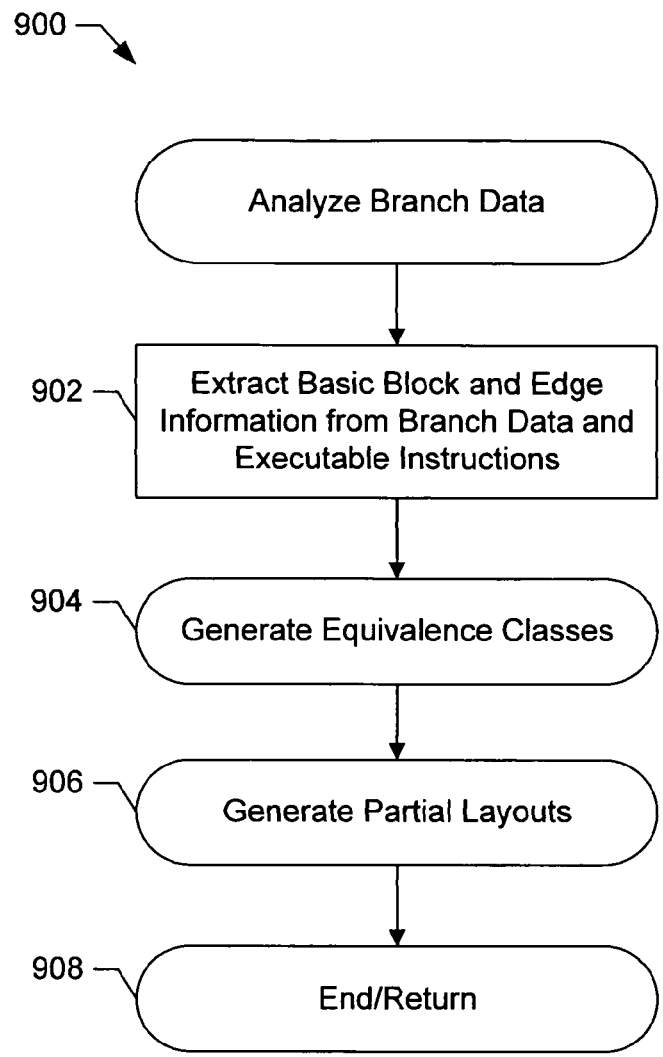
FIG. 9 is a flow diagram of an example process for analyzing branch data according to an embodiment.

FIG. 9 is a flow diagram that illustrates an example analyze branch data process 900. The analyze branch data process 900 generates one or more partial layouts (e.g., the partial layouts 214 of FIG. 2). The analyze branch data process 900 begins execution by extracting basic block and edge information from the branch data collection 210 of FIG. 2 and the executable instructions 204 of FIG. 2 (block 902). For example, many well-known techniques and programs exist to extract basic block and edge information from a branch data collection, such as UNIX® PixieTM, which is a program that implements executables using basic blocks.

After extracting the basic block and edge information (block 902), the analyze branch data process 900 invokes a generate equivalence class process (block 904). The generate equivalence class process may use the extracted basic block and edge information to construct a set of edges that may be used to generate partial layouts as described below. An example generate equivalence class process is described below in greater detail in conjunction with FIG. 10.

After returning from execution of the generate equivalence class process (block 904), the analyze branch data process 900 invokes a generate partial layouts process (block 906), and the analyze branch data process 900 ends and/or returns control to any calling routine(s) (block 908). The generate partial layouts process may generate a plurality of partial layouts for some or all of the executable instructions 204 of FIG. 2. An example generate partial layouts process is described below in greater detail in conjunction with FIG. 11.

Figure 10:
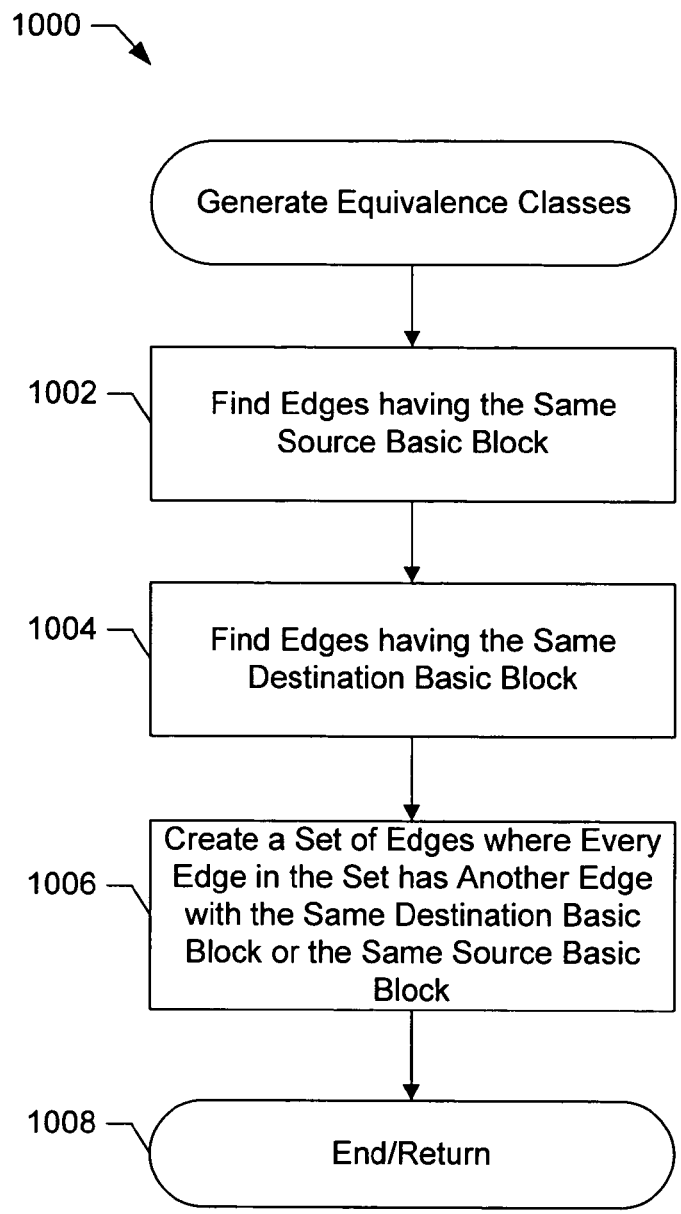
FIG. 10 is a flow diagram of an example process for generating equivalence classes according to an embodiment.

FIG. 10 is a flow diagram that illustrates an example generate equivalence classes process 1000. The generate equivalence classes process 1000 generates one or more sets of edges or equivalence classes based on properties of the edges that have been extracted from the branch data collection 210 of FIG. 2. The generate equivalence classes process 1000 begins execution by searching the branch data collection 210 of FIG. 2 for one or more edges having the same source basic block and creating a set or collection containing the edges (block 1002). For example, if the branch data collection 210 included the edges AC, AB, BE, and BD, a search for branch data having the same source basic block may result in two sets: {AC, AB} and {BE, BD}.

After finding one or more edges having the same source basic block (block 1002), the generate equivalence classes process 1000 searches the branch data collection 210 of FIG. 2 for one or more edges having the same destination basic block and creates a set or collection containing the edges (block 1004). In the above example of the branch data collection 210 including AC, AB, BE, and BD, a search for branch data having the same destination basic block may result in no sets or a NULL value, because the graph is a tree structure. In an alternative example, there may be an edge BC. In such a case, block 1004 may create a set containing the edges {AC, BC}.

After finding one or more edges having the same destination basic block (block 1004), the generate equivalence classes process 1000 generates a new set or collection of edges where every edge in the set has another edge with the same destination basic block or the same source basic block (block 1006) and ends and/or returns control to any calling routine(s) (block 1008). For example, the generate equivalence classes process 1000 may generate the new set by combining the set from block 1002 with the set from block 1004.

Figure 11:
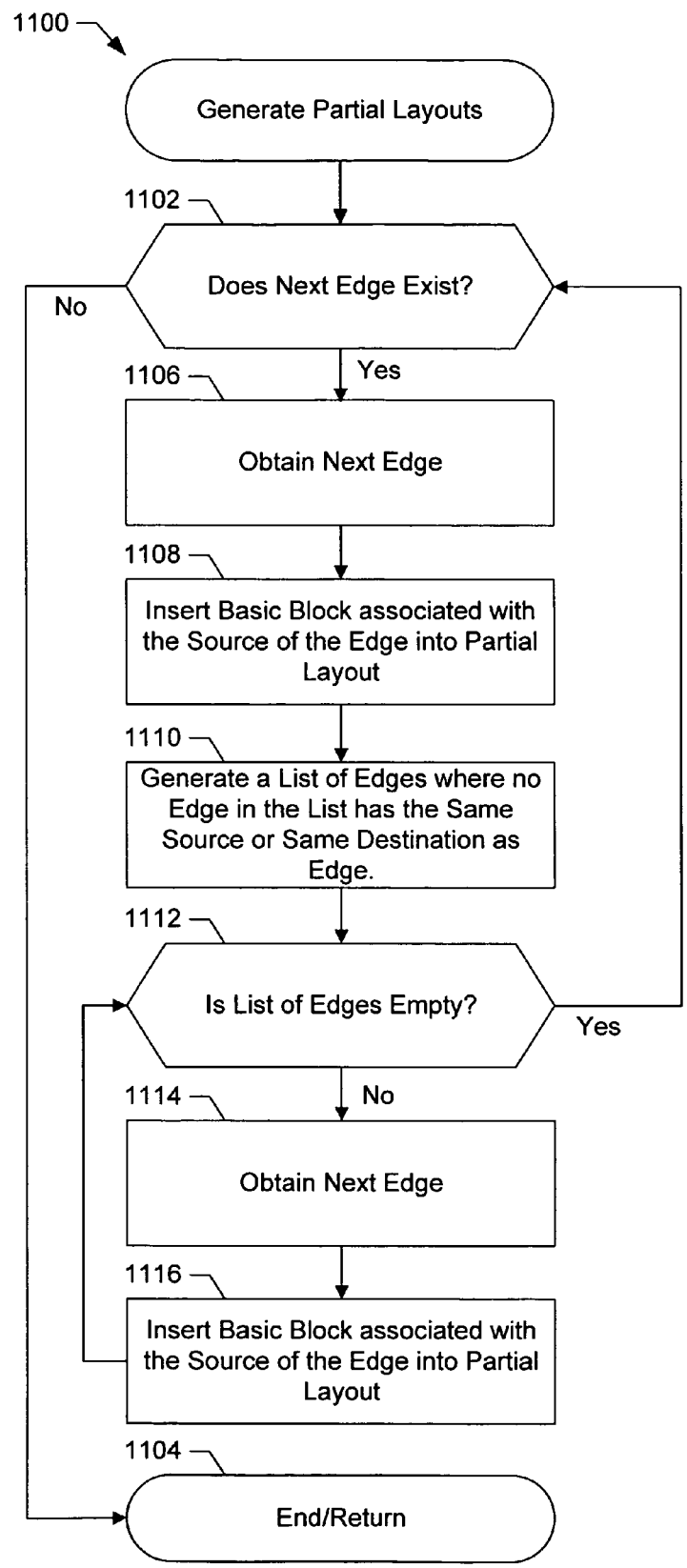
FIG. 11 is a flow diagram of an example process for generating partial layouts according to an embodiment.

FIG. 11 is a flow diagram that illustrates an example generate partial layouts process 1100. The generate partial layouts process 1100 generates a plurality of partial layouts from extracted basic block and edge information generated from the branch data collection 210 of FIG. 2 and the executable instructions 204 of FIG. 2. The generate partial layouts process 1100 begins execution by determining if a next edge exists (block 1102). For example, the edges may be stored in an element of a data structure that may be iteratively accessed. The data structure may be a linked list-based data structure, an array-based data structure, a queue-based data structure, a stack-based data structure, a tree-based data structure, or any other suitable dynamically or statically allocated data structure. If the next edge does not exist (block 1102), the generate partial layouts process 1100 ends and/or returns control to any calling routine(s) (block 1104).

On the other hand, if the next edge does exist (block 1102), the generate partial layouts process 1100 obtains the next edge (block 06) and inserts a basic block associated with a source of the next edge into a partial layout (block 1108). The basic block may be inserted into the partial layout using one or more well-known techniques for inserting one or more machine accessible instructions into memory (e.g., the main memory device 1408 of FIG. 14) and/or storage (e.g., the storage device 1416 of FIG. 14), such as, for example, a C language memcpy (i.e., memory copy) function call.

After inserting the basic block into the partial layout (block 1108), the generate partial layouts process 1100 generates a collection of edges where there exists no edge in the collection with the same source or the same destination as the next edge (block 1110). For example, the collection may be a data structure, such as a linked list-based data structure, an array-based data structure, a queue-based data structure, a stack-based data structure, a tree-based data structure, or any other suitable dynamically or statically allocated data structure.

After generating the collection (block 1110), the generate partial layouts process 1100 determines if the collection or list of edges is empty (block 1112). The generate partial layouts process 00 may determine if the collection of edges is empty using one or more well-known techniques for determining if a data structure contains elements that have not yet been processed or if the data structure contains no elements. If the collection of edges is empty or contains only elements that have been processed (block 1112), the generate partial layouts process 1100 returns control to block 1102.

On the other hand, if the collection of edges is not empty or contains elements that have not been processed (block 1112), the generate partial layouts process 1100 obtains a next edge from the collection (block 1114) and inserts a basic block associated with a source of the next edge into the partial layout (block 1116). For example, as discussed above in conjunction with block 1108, the basic block may be inserted into the partial layout using a well-known technique for inserting one or more machine accessible instructions into memory (e.g., the main memory device 1408 of FIG. 14) and/or storage (e.g., the storage device 1416 of FIG. 14). After inserting the basic block into the partial layout (block 1116), the generate partial layouts process 1100 returns control to block 1112.

Figure 12:
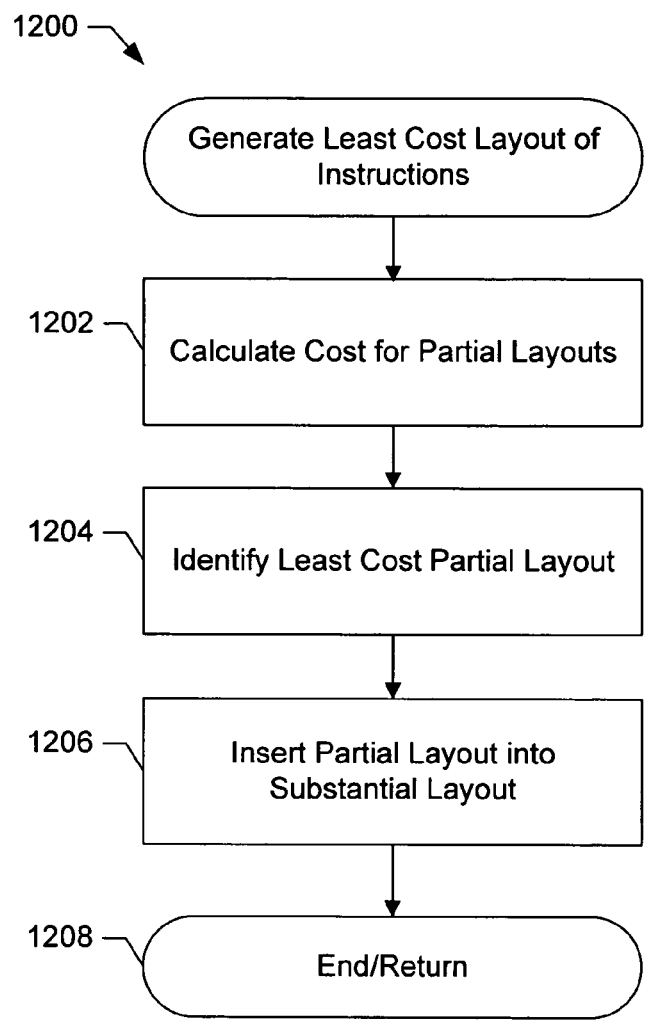
FIG. 12 is a flow diagram of an example process for identifying a least cost partial layout of instructions according to an embodiment.

FIG. 12 is a flow diagram that illustrates an example generate least cost layout of instructions process 1200. The generate least cost layout of instructions process 1200 generates a substantial layout from the plurality of partial layouts 214 of FIG. 2. The generate least cost layout of instructions process 1200 begins execution by calculating the cost of the partial layouts 214 of FIG. 2 (block 1202). The generate least cost layout of instructions process 1200 may calculate the cost for the partial layouts via a function similar to the plurality of cost expression instructions 818, 820, 828, 830, 832, 834, 840, and 844 of the cost function 808 of FIG. 8B. For example, the partial layouts 214 may comprise the basic block layouts 522, 542, 562, and 582 of FIG. 5 and the generate least cost layout of instructions process 1200 may calculate the cost of the basic block layouts 522, 542, 562, and 582 based on the cost expressions associated with the basic block layouts 522, 542, 562, and 582, respectively.

After calculating the cost of the partial layouts (block 1202), the generate least cost layout of instructions process 1200 identifies the least cost partial layout using the cost of the partial layouts 214 that are calculated in block 1202 (block 1204). For example, the identification of the least cost partial layout (block 1204) may be implemented by identifying the lowest cost value of the cost of the partial layouts 214 that is calculated in block 1202. The identification of the least cost partial layout (block 1204) may be implemented using, for example, the plurality of min function invocation instructions 816, 822, and 826, 836 of the cost function 808 of FIG. 8B.

After identifying the least cost partial layout (block 1204), the generate least cost layout of instructions process 1200 inserts the partial layout having the lowest cost into a substantial layout (block 1206) and ends and/or returns control to any calling routine(s) (block 1208). The partial layouts may be inserted into the substantial layout using one or more well-known techniques for inserting one or more machine accessible instructions into memory (e.g., the main memory device 1408 of FIG. 14) and/or storage (e.g., the storage device 1416 of FIG. 14).

Figures 13A, 13B:
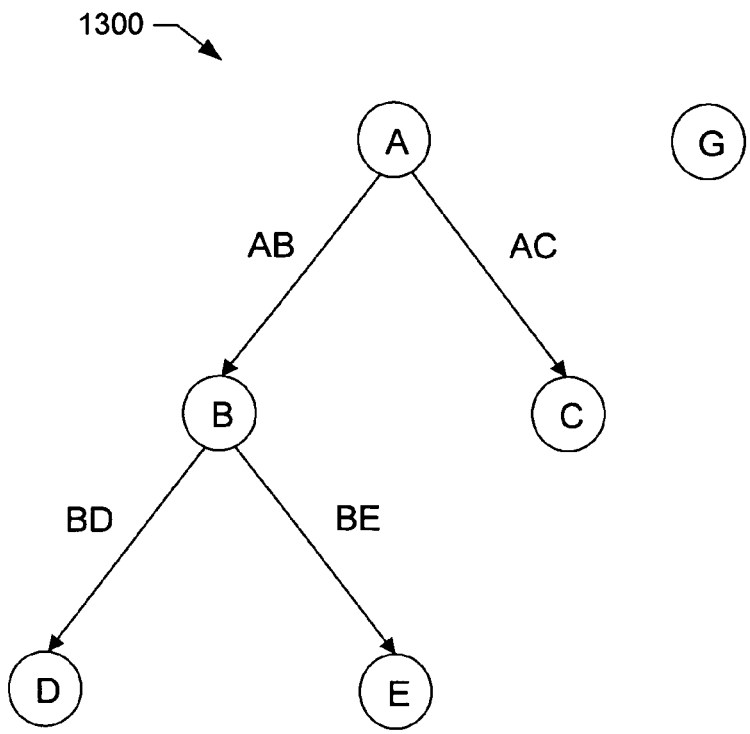
FIG. 13A is an example control flow graph that depicts the logical relationship among a plurality of basic blocks subsequent to modification of the layout of the basic blocks according to an embodiment.
FIG. 13B is an example sequential memory location representation of a basic block layout of the basic blocks of FIG. 13A subsequent to modification of the layout of the basic blocks in a memory.

FIG. 13A depicts a control flow graph of a substantial layout 1300 of the basic blocks subsequent to modification (e.g., the modified instructions 110 of FIG. 1, the modified instructions 218 of FIG. 2, etc.). The substantial layout 1300 includes a plurality of basic blocks (i.e., a basic block A, a basic block B, a basic block C, a basic block D, a basic block E, and a basic block G) and a plurality of edges (i.e., an AB edge, an AC edge, an BD edge, and an BE edge).

FIG. 13B depicts a contiguous memory representation (i.e., a memory map) of a substantial layout 1310 subsequent to modification (e.g., the modified instructions 110 of FIG. 1, the modified instructions 218 of FIG. 2, etc.). The substantial layout 1310 is a sequentially ordered grouping of machine accessible instructions that are stored in memory and/or storage. For example, the substantial layout 1310 may be stored in one or more files stored on the storage device 1416 of FIG. 14, a portion of memory on the main memory device 1408, or any other suitable memory device.

The substantial layout 1310 includes a plurality of basic blocks A, B, C, D, E, and G having an ordering (i.e., A, C, B, E, D, and G) that has been assigned by a generate least cost layout of instructions process (e.g., the generate least cost layout of instructions process 216 of FIG. 2). As described in greater detail above in conjunction with FIG. 12, the ordering of the substantial layout 1310 is determined using a plurality of cost metrics.

FIG. 14 is a block diagram of a computer system 1400 that may implement the example apparatus and methods or processes described herein. The computer system 1400 may be a server, a personal computer (PC), a personal digital assistant (PDA), an Internet appliance, a cellular telephone, or any other computing device. In one example, the computer system 1400 includes a main processing unit 1401 powered by a power supply 1402. The main processing unit 1401 may include a processor 1403 communicatively coupled by a system interconnect 1406 to a main memory device 1408 and to one or more interface circuits 1410. In one example, the main memory device 1408 stores one or more applications 1411 to be executed by the processor 1403 in a well-known manner.

The applications 1411 may include any application or service executing on the processor 1403. For example, the applications 1411 may include programs such as Microsoft® WordTM, International Business Machines (IBM®) Lotus Notes®, etc. Additionally, the applications 1411 may execute with the assistance of an operating system such as a Microsoft® Windows® operating system, an UNIX® operating system, a Linux® operating system, etc.

The system interconnect 1406 may be, for example, an address/data bus. Of course, a person of ordinary skill in the art will readily appreciate that interconnects other than busses may be used to connect the processor 1403 to the main memory device 1408. For example, one or more dedicated lines and/or a crossbar may be used to connect the processor 1403 to the main memory device 1408.

The processor 1403 may include one or more of any type of well-known processor, such as a processor from the Intel Pentium® family of microprocessors, the Intel Itanium® family of microprocessors, and/or the Intel XScale® family of processors. In addition, the processor 1403 may include any type of well-known cache memory, such as static random access memory (SRAM).

The main memory device 1408 may include dynamic random access memory (DRAM) and/or any other form of random access memory. For example, the main memory device 1408 may include double data rate random access memory (DDRAM). The main memory device 1408 may also include non-volatile memory. In one example, the main memory device 1408 stores a software program which is executed by the processor 1403 in a well-known manner. The main memory device 1408 may store one or more compiler programs, one or more software programs, and/or any other suitable program capable of being executed by the processor 1403.

The interface circuit(s) 1410 may be implemented using any type of well-known interface standard, such as an Ethernet interface and/or a Universal Serial Bus (USB) interface. One or more input devices 1412 may be connected to the interface circuits 1410 for entering data and commands into the main processing unit 1401. For example, an input device 1412 may be a keyboard, mouse, touch screen, track pad, track ball, isopoint, and/or a voice recognition system.

One or more displays, printers, speakers, and/or other output devices 1414 may also be connected to the main processing unit 1401 via one or more of the interface circuits 1410. The display 1414 may be a cathode ray tube (CRT), a liquid crystal display (LCD), or any other type of display. The display 1414 may generate visual indications of data generated during operation of the main processing unit 1401. The visual indications may include prompts for human operator input, calculated values, detected data, etc.

The computer system 1400 may also include one or more storage devices 1416. For example, the computer system 1400 may include one or more hard drives, a compact disk (CD) drive, a digital versatile disk drive (DVD), and/or other computer media input/output (I/O) devices.

The computer system 1400 may also exchange data with other devices, such as a network device 1422, via a connection to a network 1418. The network connection may be any type of network connection, such as an Ethernet connection, digital subscriber line (DSL), telephone line, coaxial cable, etc. The network 1418 may be any type of network, such as the Internet, a telephone network, a cable network, and/or a wireless network.

The processes described above may be implemented using one or more software programs or sets of machine accessible instructions that are stored on a machine accessible medium (e.g., the main memory device 1408 and/or the storage devices 1416 of FIG. 14) and executed by one or more processors (e.g., the processor 1403 of FIG. 14). However, some or all of the blocks of the above-described processes may be performed manually and/or by some other device. Additionally, although the above-described processes are described with reference to the illustrated flow diagrams, persons of ordinary skill in the art will readily appreciate that many other methods of performing the above listed processes may be used instead. For example, the order of many of the blocks may be altered, the operation of one or more blocks may be changed, blocks may be combined, and/or blocks may be eliminated.

Although certain apparatus, methods, and articles of manufacture have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method comprising:
identifying branch data associated with a plurality of machine accessible instructions;
identifying a plurality of basic blocks associated with the branch data;
searching for a set of edges comprising a subset of the plurality of basic blocks, wherein each edge in the set of edges obtained by searching shares either a source basic block or a destination basic block with another edge in the set of edges;
generating a set of partial layouts from the subset of the plurality of basic blocks included in the set of edges;
generating a substantial layout using a particular partial layout selected from the set of partial layouts based on a cost metric comprising an accumulation of individual costs determined for each pair of adjacent basic blocks in a particular sequential ordering of the plurality of basic blocks included in the particular partial layout, wherein the individual cost for each pair of adjacent basic blocks is determined using a first cost metric when the pair of adjacent basic blocks is connected in the particular partial layout and a second cost metric when the pair of adjacent basic blocks is not connected in the particular partial layout; and
determining a plurality of modified machine accessible instructions based on the substantial layout.

2. The method as defined in claim 1, wherein the set of edges comprises an equivalence class, and further comprising generating a plurality of sets of partial layouts for a respective plurality of equivalence classes, and wherein generating the substantial layout further comprises combining a selected plurality of least cost partial layouts corresponding respectively to the plurality of equivalence classes, wherein each least cost partial layout is selected for a respective equivalence class from the respective set of partial layouts generated for the respective equivalence class, and wherein the selected least cost partial layout minimizes the cost metric for the set of partial layouts corresponding to the respective equivalence class.

3. The method as defined in claim 1, further comprising:
identifying a first edge associated with a first source basic block associated with the plurality of basic blocks; and
identifying a second edge associated with a second source basic block associated with the plurality of basic blocks.

4. The method as defined in claim 1, further comprising:
identifying a first edge associated with a first destination basic block associated with the plurality of basic blocks; and identifying a second edge associated with a second destination basic block associated with the plurality of basic blocks.

5. The method as defined in claim 1, further comprising simulating execution of the plurality of machine accessible instructions.

6. The method as defined in claim 5, further comprising generating profiling information associated with the simulated execution of the plurality of machine accessible instructions.

7. The method as defined in claim 6, further comprising generating the branch data from the profiling information.

8. The method as defined in claim 1, further comprising generating a set comprising a plurality of edges, wherein each edge of the plurality of edges is associated with a first source basic block and a first destination basic block and wherein the first source basic block is the same as a second source basic block of a second edge within the set or the first destination basic block is the same basic block as a second destination basic block of a third edge.

9. The method as defined in claim 1, wherein generating the set of partial layouts from the plurality of basic blocks comprises inserting a basic block associated with the plurality of basic blocks into the particular partial layout.

10. The method as defined in claim 1, further comprising:
calculating a cost associated with the cost metric;
identifying a least cost partial layout associated with a plurality of partial layouts; and
inserting the least cost partial layout into the substantial layout.

11. The method as defined in claim 1, wherein the cost metric comprises at least one of a first cost associated with incorrectly predicting execution of a first branch and not taking the first branch and a second cost associated with correctly predicting execution of a second branch and not taking the second branch.

12. The method as defined in claim 1, wherein the cost metric comprises at least one of a first cost associated with incorrectly predicting execution of a first branch and taking the first branch and a second cost associated with correctly predicting execution of a second branch and taking the second branch.

13. The method as defined in claim 1, wherein the cost metric comprises a cost associated with unconditionally taking a branch.

14. The method as defined in claim 1, further comprising inserting a branch predictor indicator into the particular partial layout.

15. An apparatus comprising:
a memory; and
a processor coupled to the memory and configured to:
identify branch data associated with a plurality of machine accessible instructions;
identify a plurality of basic blocks associated with the branch data;
search for a set of edges comprising a subset of the plurality of basic blocks, wherein each edge in the set of edges obtained by the search shares either a source basic block or a destination basic block with another edge in the set of edges;
generate a set of partial layouts from the subset of the plurality of basic blocks included in the set of edges;
generate a substantial layout using a particular partial layout selected from the set of partial layouts based on a cost metric comprising an accumulation of individual costs determined for each pair of adjacent basic blocks in a particular sequential ordering of the plurality of basic blocks included in the particular partial layout, wherein the individual cost for each pair of adjacent basic blocks is determined using a first cost metric when the pair of adjacent basic blocks is connected in the particular partial layout and a second cost metric when the pair of adjacent basic blocks is not connected in the particular partial layout; and determine a plurality of modified machine accessible instructions based on the substantial layout.

16. The apparatus as defined in claim 15, wherein the processor is configured to identify the plurality of basic blocks associated with the branch data by identifying a plurality of equivalence classes associated with the branch data.

17. The apparatus as defined in claim 15, wherein the processor is programmed to:
identify a first edge associated with a first source basic block associated with the plurality of basic blocks; and
identify a second edge associated with a second source basic block associated with the plurality of basic blocks.

18. The apparatus as defined in claim 15, wherein the processor is programmed to:
identify a first edge associated with a first destination basic block associated with the plurality of basic blocks; and
identify a second edge associated with a second destination basic block associated with the plurality of basic blocks.

19. The apparatus as defined in claim 15, wherein the processor is programmed to:
calculate a cost associated with the cost metric;
identify a least cost partial layout associated with a plurality of partial layouts; and
insert the least cost partial layout into the substantial layout.

20. The apparatus as defined in claim 15, wherein the cost metric comprises at least one of a first cost associated with incorrectly predicting execution of a first branch and not taking the first branch and a second cost associated with correctly predicting execution of a second branch and not taking the second branch.

21. The apparatus as defined in claim 15, wherein the cost metric comprises at least one of a first cost associated with incorrectly predicting execution of a first branch and taking the first branch and a second cost associated with correctly predicting execution of a second branch and taking the second branch.

22. A machine readable medium having instructions stored thereon that, when executed, cause a machine to:
identify branch data associated with a plurality of machine accessible instructions;
identify a plurality of basic blocks associated with the branch data;
search for a set of edges comprising a subset of the plurality of basic blocks, wherein each edge in the set of edges obtained by the search shares either a source basic block or a destination basic block with another edge in the set of edges;
generate a partial layout from the subset of the plurality of basic blocks included in the set of edges;
generate a substantial layout from the partial layout based on a cost metric comprising an accumulation of individual costs determined for each pair of adjacent basic blocks in a particular sequential ordering of the plurality of basic blocks included in the partial layout, wherein the individual cost for each pair of adjacent basic blocks is determined using a first cost metric when the pair of adjacent basic blocks is connected in the partial layout and a second cost metric when the pair of adjacent basic blocks is not connected in the partial layout; and determine a plurality of modified machine accessible instructions based on the substantial layout.

23. The machine readable medium as defined in claim 22, wherein each particular pair of adjacent blocks comprises a first basic block and a second basic block, and wherein the instructions, when executed, cause the machine to:
determine the first cost metric to be a minimum of a first cost combination and a second cost combination, wherein the first cost combination comprises combining a first cost and a second cost, wherein the first cost is associated with taking a first branch between the first basic block and the second basic block but incorrectly predicting execution of a second branch between the first basic block and a third basic block in the partial layout, and the second cost is associated with taking the second branch upon correctly predicting execution of the second branch, and wherein the second cost combination comprises combining a third cost and a fourth cost, wherein the third cost is associated with taking the first branch upon correctly predicting the second branch would not be executed, and the fourth cost is associated with taking the second branch but incorrectly predicting the second branch would not be executed; and
determine the second cost metric to be a minimum of a third cost combination, a fourth cost combination, a fifth cost combination and a sixth cost combination, wherein the third cost combination comprises combining a fifth cost and a sixth cost, wherein the fifth cost is associated with taking a third branch between the first basic block and a fourth basic block in the partial layout but incorrectly predicting execution of the second branch between the first basic block and the third basic block, and the sixth cost is associated with taking the second branch upon correctly predicting execution of the second branch, wherein the fourth combination comprises a seventh cost and an eighth cost, wherein the seventh cost is associated with taking the third branch upon correctly predicting the second branch would not be executed, and the eighth cost is associated with taking the second branch but incorrectly predicting the second branch would not be executed, wherein the fifth combination comprises a ninth cost and a tenth cost, wherein the ninth cost is associated with taking the second branch but incorrectly predicting execution of the third branch, and the tenth cost is associated with taking the third branch upon correctly predicting execution of the third branch, and wherein the sixth combination comprises an eleventh cost and a twelfth cost, wherein the eleventh cost is associated with taking the second branch upon correctly predicting the third branch would not be executed, and the twelfth cost is associated with taking the third branch but incorrectly predicting the third branch would not be executed.

24. The machine readable medium as defined in claim 22, wherein the instructions, when executed, cause the machine to:
identify a first edge associated with a first source basic block associated with the plurality of basic blocks; and
identify a second edge associated with a second source basic block associated with the plurality of basic blocks.

25. The machine readable medium as defined in claim 22, wherein the instructions, when executed, cause the machine to:
identify a first edge associated with a first destination basic block associated with the plurality of basic blocks; and
identify a second edge associated with a second destination basic block associated with the plurality of basic blocks.

26. The machine readable medium as defined in claim 22, wherein the instructions, when executed, cause the machine to:
  calculate a cost associated with the cost metric;
  identify a least cost partial layout associated with a plurality of partial layouts; and
  insert the least cost partial layout into the substantial layout.

27. The machine readable medium as defined in claim 22, wherein the cost metric comprises at least one of a first cost associated with incorrectly predicting execution of a first branch and not taking the first branch and a second cost associated with correctly predicting execution of a second branch and not taking the second branch.

28. The machine readable medium as defined in claim 22, wherein the cost metric comprises at least one of a first cost associated with incorrectly predicting execution of a first branch and taking the first branch and a second cost associated with correctly predicting execution of a second branch and taking the second branch.

* * * * *